United States Patent
Arai et al.

(10) Patent No.: US 9,397,372 B2
(45) Date of Patent: Jul. 19, 2016

(54) SEALED BATTERY INCLUDING CURRENT INTERRUPTING MECHANISM

(71) Applicants: TOYOTA JIDOSHA KABUSHIKI KAISHA, Toyota-shi, Aichi (JP); SANYO Electric Co., Ltd., Moriguchi-shi, Osaka (JP)

(72) Inventors: Takuichi Arai, Toyota (JP); Toshihiro Takada, Toyota (JP); Hiroshi Inukai, Toyota (JP); Hironori Harada, Aichi-ken (JP); Akira Kiyama, Toyota (JP); Ryuta Morishima, Nagoya (JP); Naoya Nakanishi, Tondabayashi (JP); Yasuhiro Yamauchi, Kasai (JP); Yoshinori Yokoyama, Kasai (JP)

(73) Assignees: Toyota Jidosha Kabushiki Kaisha, Toyota-shi, Aichi (JP); Sanyo Electric Co., Ltd., Moriguchi-shi, Osaka (JP)

( * ) Notice: Subject to any disclaimer, the term of this patent is extended or adjusted under 35 U.S.C. 154(b) by 256 days.

(21) Appl. No.: 13/749,882

(22) Filed: Jan. 25, 2013

(65) Prior Publication Data
US 2013/0196191 A1 Aug. 1, 2013

(30) Foreign Application Priority Data
Jan. 27, 2012 (JP) .................................. 2012-015981

(51) Int. Cl.
| | |
|---|---|
| H01M 10/42 | (2006.01) |
| H01M 2/06 | (2006.01) |
| H01M 2/34 | (2006.01) |
| H01M 2/26 | (2006.01) |
| H01M 10/04 | (2006.01) |
| H01M 10/0525 | (2010.01) |
| H01M 10/0587 | (2010.01) |

(52) U.S. Cl.
CPC ............ *H01M 10/4235* (2013.01); *H01M 2/06* (2013.01); *H01M 2/345* (2013.01); *H01M 2/263* (2013.01); *H01M 10/0431* (2013.01); *H01M 10/0525* (2013.01); *H01M 10/0587* (2013.01); *H01M 2220/20* (2013.01); *Y02T 10/7011* (2013.01)

(58) Field of Classification Search
CPC ....... H01M 2/12; H01M 10/00; H01M 10/34; H01M 10/52
USPC .................... 429/53, 56, 57, 60, 61
See application file for complete search history.

(56) References Cited

U.S. PATENT DOCUMENTS

| | | |
|---|---|---|
| 6,187,472 B1 | 2/2001 | Shiota et al. |
| 8,304,109 B2 | 11/2012 | Nansaka et al. |

(Continued)

FOREIGN PATENT DOCUMENTS

| | | |
|---|---|---|
| CA | 2099657 | 2/1994 |
| CN | 101834306 | 9/2010 |

(Continued)

*Primary Examiner* — Nicholas P D'Aniello
(74) *Attorney, Agent, or Firm* — Finnegan, Henderson, Farabow, Garrett & Dunner, LLP

(57) ABSTRACT

Provided is a sealed battery with improved safety and reliability in which no spark discharge or voltage recovery occurs after a current interrupt mechanism has been actuated. A sealed battery 10 includes a current interrupt mechanism 40: having an inversion plate 50 and a collector 60. The collector 60 and the inversion plate 50 are electrically and mechanically joined in the easily breakable section 61 and the inversion section 51, the easily breakable section 61 is broken and displaced together with the inversion section 51 by the displacement of the inversion section 51, and the electric connection of the collector 60 and the inversion plate 50 is interrupted. The distance between the collector 60 and the easily breakable section 61 after the displacement is within a range of 0.3 mm to 1.5 mm.

8 Claims, 5 Drawing Sheets

(56) References Cited

U.S. PATENT DOCUMENTS

2002/0152608 A1* 10/2002 Kita et al. .................... 29/623.1
2008/0038627 A1*  2/2008 Yamauchi et al. ............. 429/53
2010/0178539 A1   7/2010 Elia et al.
2010/0233529 A1   9/2010 Nansaka et al.
2011/0039136 A1*  2/2011 Byun et al. .................... 429/56

FOREIGN PATENT DOCUMENTS

| JP | 6-196150    | 7/1994  |
| JP | 10-294097   | 11/1998 |
| JP | 2002-298831 | 10/2002 |
| JP | 2010-212034 | 9/2010  |

* cited by examiner

SEALED BATTERY INCLUDING CURRENT INTERRUPTING MECHANISM

BACKGROUND OF THE INVENTION

1. Field of the Invention

The present invention relates to a sealed battery, and more particularly to a sealed battery equipped with a mechanism that interrupts an electric current when the internal pressure of the battery case rises above a predetermined pressure.

Note that this application claims priority under the Paris Convention based on Japanese Patent Application No. 2012-015981, filed on Jan. 27, 2012, the entire contents of which are incorporated into this application by reference.

2. Description of the Related Art

Lithium ion secondary batteries, nickel hydride batteries and other secondary batteries have recently gained importance as power sources for vehicles that use electricity as drive power, or power sources installed in personal computers, portable terminals, and other electric devices. Such secondary batteries typically have a sealed structure (sealed batteries) in which a positive electrode and a negative electrode are sealed inside a battery case. Such sealed batteries are typically used while being controlled to a predetermined voltage range (for example, from 3.0 V to 4.2 V), and it can be supposed that where an abnormally high current is supplied to the battery, for example, due to malfunction, the predetermined voltage is exceeded and an overcharged state is assumed. During such overcharge, the electrolytic solution can be decomposed and gases can be generated inside the battery case, or the temperature inside the battery can rise due to heat generation in the active material. Accordingly, a battery provided with a mechanism that interrupts the electric current when the overcharge state is detected on the basis of battery temperature or pressure inside the battery (current interrupt mechanism, that is also called current interrupt device: CID) with the object of resolving the above-described problem has been suggested (see, for example, Japanese Patent Application Publication No. 2010-212034).

The current interrupt mechanism is provided, for example, in a conductive path between an outer connection terminal in a sealed battery (typically, a positive electrode outer connection terminal) and an electrode body accommodated inside the sealed battery. The current interrupt mechanism generally can be integrated with a sealing plate serving as the lid of the battery case of the sealed battery, with consideration for battery configuration and assembling ability.

For example, the current interrupt mechanism is provided on the inner side of the battery with respect to the sealing plate between the sealing plate and the electrode body. The current interrupt mechanism is essentially constituted by an inversion plate and a collector. The inversion plate is a member that is electrically connected to the connection terminal and configured such that an inversion section of the inversion plate is displaced and deformed outward of the battery when the pressure inside the battery rises. Further, the collector is electrically connected to the electrode body accommodated in the battery case and has an easily breakable section that is easily broken when predetermined stresses act thereupon. The inversion plate and the collector are usually joined together at the inversion section and the easily breakable section. However, when the pressure inside the battery rises and the inversion plate deforms in the overcurrent state, the easily breakable section of the collector breaks down and separates from the collector, thereby interrupting the conductive path of the inversion plate and the collector.

However, in the sealed battery equipped with such current interrupt mechanism, after the current interrupt mechanism has been actuated during the overcurrent, a spark is generated between the inversion plate and the collector and a pulse-shaped conduction occurs. A voltage recovery effect (residual voltage is present) is sometimes observed after the current interrupt mechanism is actuated.

For example, when the operation of the battery is managed by a control system, an abnormality in the battery can be detected by the voltage dropping to zero when the current is interrupted. Therefore, where such a conduction caused by a spark discharge occurs or a residual voltage is present after the current has been interrupted, the control system does not detect the battery abnormality and the system cannot be rapidly stopped.

SUMMARY OF THE INVENTION

The present invention has been created with the foregoing in view, and it is an object of the present invention to provide a highly safe and reliable sealed battery in which no spark discharge or voltage recovery occurs after the current interrupt mechanism has been actuated.

The inventors have conducted a comprehensive study of causes for the spark discharge occurring after the current interrupt mechanism 40 has been actuated. The results obtained demonstrate that the discharge occurs because the distance between the easily breakable section 61 that displaces together with the inversion plate 50 and the main body of the collector 60, that is, the distance of closest approach of the conductive section on the outer connection terminal side and the conductive section on the electrode body side is small.

Further, the following cause can be suggested for the aforementioned voltage recovery after current interrupt mechanism 40 has been actuated. Thus, where the sealed battery 10 gets into the overcharge state, not only the electrolytic solution is decomposed, but also a large amount of electrolytic solution is evaporated inside the battery case 11 due to heat generation in the battery and increase in pressure inside the case. Before the current interrupt mechanism 40 is actuated, the vapors of the electrolytic, solution diffuse to the inner side of the case with respect to the inversion plate 50 and the collector 60. However, after the current interrupt mechanism 40 has been actuated, for example, as shown in FIG. 3, the vapors can also flow into the space formed between an electrically insulating collector holder 65, which is disposed between the inversion plate 50 and the collector 60, and the inversion plate 50 that has displaced and risen. Since the electrolytic solution vapors are liquefied when the battery temperature drops after the current has been interrupted, no problem is encountered as long as the amount of the electrolytic solution vapors that have flown into this space is small, but when a large amount of the electrolytic solution vapors flows into the space, the liquefied vapors can form liquid droplets on the inversion plate 50 or the collector holder 65. The aforementioned voltage recovery effect apparently occurs because those liquid droplets cause re-conduction (liquid short-circuit) in the inversion plate 50 and the collector 60.

Subsequent research conducted by the inventors demonstrated that this liquid short-circuit effect easily occurs when the electric contact of the inversion plate 50 and the collector 60 is physically interrupted, the distance of closest approach of the conductive sections on the inversion plate 50 side and the collector 60 side becomes equal to or greater than a predetermined value, and electrolytic solution vapors easily penetrate from a gap between the inversion plate 50 and the collector 60 into the aforementioned space.

In order to resolve the above-described problems, the present invention provides a sealed battery including: a positive electrode and a negative electrode; a battery case accommodating the positive electrode and the negative electrode; an outer connection terminal that is formed to protrude to the outside of the battery case and is electrically connected to one of the positive electrode and the negative electrode; and a current interrupt mechanism that is provided in a conductive path electrically connecting the electrode and the outer connection terminal and cuts off the conductive path. The current interrupt mechanism includes: an inversion plate that is electrically connected to the outer connection terminal and has an inversion section that can displace outward of the battery case when a pressure inside the battery case exceeds a predetermined pressure; and a collector that is disposed further toward the inner side of the case than the inversion plate and electrically connected to the electrode and has an easily breakable section that can be broken in part thereof.

The collector and the inversion plate are electrically and mechanically joined in the easily breakable section and the inversion section, the easily breakable section is broken and displaced together with the inversion section by the displacement of the inversion section, whereby the electric connection of the collector and the inversion plate can be interrupted. The distance between the collector and the easily breakable section after the displacement is within a range of 0.3 mm to 1.5 mm.

Such a configuration makes it possible to maintain the adequate shortest distance (sometimes also referred to as "distance of closest approach") between the collector (conductive section on the electrode side) after the current interrupt mechanism has been actuated and the easily breakable section (conductive section on the connection terminal side) after the displacement, without an insulating section being interposed therebetween. Thus, where the distance of closest approach is equal to or greater than 0.3 mm, the occurrence of spark or generation of spark discharge between the collector and the easily breakable section can be prevented and current leak can be also prevented. Further, where the distance of closest approach is equal to or less than 1.5 mm, electrolytic solution vapors are prevented from flowing in a large amount into the space formed by the displaced inversion plate 50, the appearance of liquid droplets can be prevented, and voltage recovery caused by the liquid can be prevented. This distance of closest approach that is from 0.3 mm to 1.5 mm can be a constant value that does not depend, for example, on the dimensions of the battery or dimensions of the inversion plate. Therefore, this value can be used as a clearer indicator for ensuring safety and reliability when designing current interrupt mechanisms for various applications.

The configuration in which a fixing pin is used to prevent the re-conduction as the current is interrupted is known (Japanese Patent Application Publication No. H10-294097). However, in such a configuration, the restoration of electric contact by pressure or vibrations after current interruption is physically prevented by using another member, and a specific problem encountered in the invention disclosed herein, that is, liquid short-circuit caused by the configuration of the current interrupt mechanism, is not resolved.

In the preferred mode of the sealed battery disclosed herein, the inversion plate has the inversion section of a substantially round shape that is constituted by a flat surface in the central portion thereof and an inclined section of a substantially round shape in a plan view thereof that inclines from the inversion section toward a circumferential edge; and the inversion section is joined to the easily breakable section in a state in which a stress is applied from the outside of the battery case and the inversion section is deformed into a substantially flat shape.

With such a configuration of the inversion plate, the internal pressure of the battery can be more efficiently used as a force for deflecting the inversion plate. Further, where the inversion plate has such a substantially truncated conical shape (the shape obtained by removing the cone apex to obtain a substantially trapezoidal cross section), even if the inversion plate is deformed into a substantially flat shape during assembling, the deformations and stresses caused by deformation do not concentrate in a specific zone and a more stable state can be maintained. Further, the shape of the inversion plate that satisfies the abovementioned condition relating to the distance of closest approach can be easier designed with consideration for the shape and dimensions of other members such as the battery and collector.

In the preferred mode of the sealed battery disclosed herein, the diameter of the bottom portion of the inclined section is from 8 mm to 22 mm. A current interrupt mechanism provided with an inversion plate that is inverted outward of the battery case when the internal pressure of the battery case exceeds a predetermined pressure has heretofore been used in comparatively small sealed batteries, and the operation thereof in large batteries has not been investigated. In particular, it is absolutely unknown how such mechanism would operate in a battery that requires a large capacity and a high energy density characteristic. Meanwhile, the present invention makes it possible to provide a sealed battery having the abovementioned safety and reliability regardless of the shape and dimensions of the battery and other components such as the collector. Therefore, the present invention can be advantageously used in a comparatively large battery, for example, such in which the diameter of the bottom portion of the inclined section of the inversion plate is from 8 mm to 22 mm.

In the preferred mode of the sealed battery disclosed herein, the connection terminal has, inside thereof, a through hole passing from the outside of the battery to the space on the outer side of the current interrupt mechanism; and the through hole is sealed with a terminal plug so as to seal the space on the outer side of the current interrupt mechanism. With such a configuration, for example, it is possible to realize a structure in which the electrolytic solution or cleaning solution is unlikely to penetrate into the current interrupt mechanism when the battery is assembled. Further, since the aforementioned space communicates with the outside before the terminal plug is mounted, the inversion plate can be deformed to a substantially flat shape and can be easily joined to the easily breakable section.

In the preferred mode of the sealed battery disclosed herein, the positive electrode and the negative electrode are laminated, with a separator being interposed therebetween, and the laminate is wound to configure a wound electrode body. With such a configuration, a battery of a larger capacity at the same volume can be constructed efficiently and in an easy manner. Therefore, where the above-described features of the present invention are used in such a configuration, the merits thereof can be demonstrated to a greater extent.

In the preferred mode of the sealed battery disclosed herein, the electrode is a positive electrode, the collector is formed from aluminum or an aluminum alloy, the easily breakable section is thinner than other portions of the collector, and a notch is provided along a circumferential edge of the easily breakable section. The easily breakable section is preferably configured such as to break easily when the internal pressure of the battery rises due to the overcurrent, so as to enable fast actuation of the current interrupt mechanism. Therefore, with such a feature, it is possible to configure an easily breakable section that can be broken easier, while maintaining electric conduction.

Thus, the sealed battery disclosed herein is provided with a highly safe and reliable current interrupt mechanism such that problems associated with spark discharge or liquid short-circuit are not encountered even when the battery gets into an overcurrent state. Therefore, the sealed battery disclosed herein can be advantageously used for a drive power source for a vehicle that is installed on a vehicle such as a hybrid vehicle that requires a particularly high-level output characteristic or cycle characteristic at a high rate, and also a plug-in hybrid vehicle or an electric automobile that requires a particularly high capacity (for example, 3 to 30 Ab, more specifically 10 to 30 Ah). Accordingly, the present invention can also advantageously provide a vehicle equipped with the above-described sealed battery as a drive power source.

DESCRIPTION OF THE PREFERRED EMBODIMENTS

Figure 1:
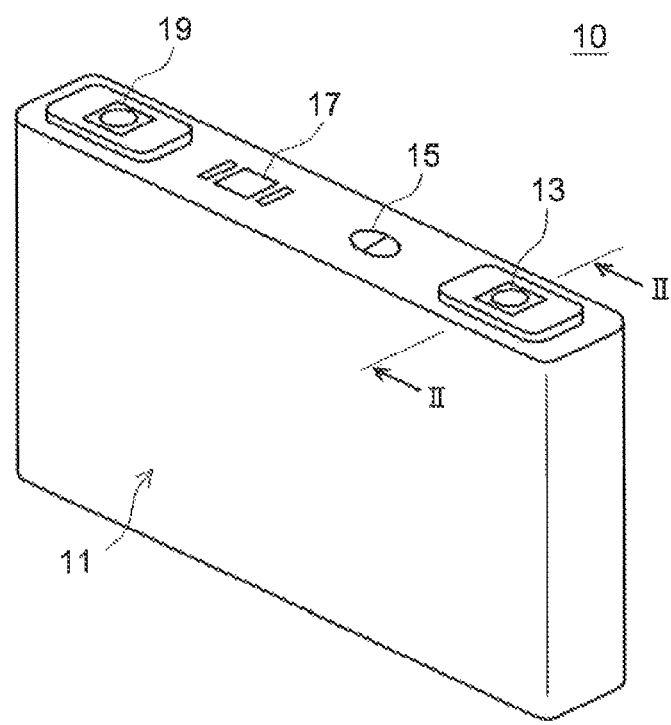
FIG. 1 is a schematic perspective view of the sealed battery according to an embodiment.

The invention disclosed herein will be described below in greater detail on the basis of an embodiment of the present invention with reference to the appended drawings. In the drawings, members and parts demonstrating like action are assigned with like reference symbols and redundant explanation thereof is herein omitted or simplified. Further, the dimensional relationship (length, width, thickness, and the like) in the figures does not necessarily reflect the actual dimensional relationship. In particular, the shape of the inversion plate and the dimensional relationship between the inversion plate and other members are not limited to the examples illustrated by the figures, and various modes thereof can be considered. The features other than those particularly described in the present specification and necessary to implement the present invention can be considered as design matters for a person skilled in the art that are based on the related art in the pertinent technical field.

A lithium secondary battery is explained by way of example as the preferred embodiment relating to the sealed battery disclosed herein, but the application object of the present invention is not intended to be limited to such a battery. The term "battery" in the present description generally refers to power storage devices from which electric energy can be obtained and is inclusive of primary batteries and secondary batteries. Further, the term "secondary battery", as referred to herein is inclusive of the so-called storage batteries (that is, chemical batteries) such as a lithium ion secondary battery, a metallic lithium secondary battery, a nickel hydride battery, and a nickel-cadmium battery, and also of capacitors (the so-called physical batteries) such as an electric double-layer capacitor. Typically, the technology disclose herein may be suitably adopted to a sealed secondary battery.

Figure 2:
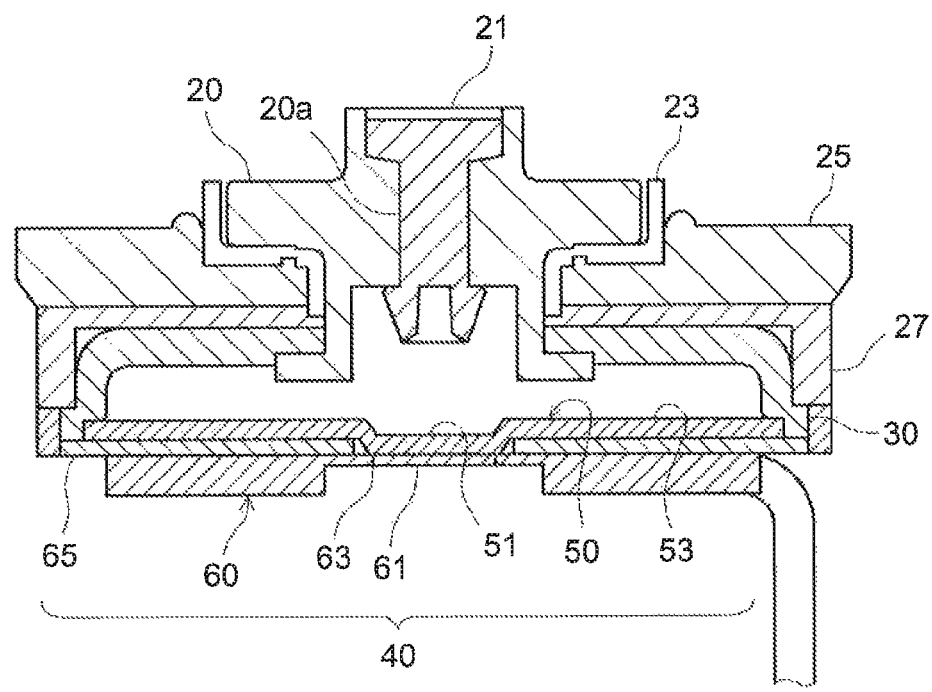
FIG. 2 is a cross-sectional schematic view illustrating on an enlarged scale the principal section of the current interrupt mechanism taken along the II-II cross section in FIG. 1; this figure illustrates the state before the current interrupt mechanism of the sealed battery is actuated.

FIG. 1 is a schematic perspective view of a lithium ion secondary battery according to the first embodiment. FIG. 2 is a schematic cross-sectional view illustrating on an enlarged scale the current interrupt mechanism in the II-II cross section in FIG. 1. This figure illustrates a state before the current interrupt mechanism is actuated.

As shown in FIG. 1, a lithium ion secondary battery 10 according to the present embodiment has a configuration in which a wound electrode body (not shown in the figure) typically including predetermined battery constituent materials (positive and negative electrodes in which active materials are held at respective positive and negative electrode collectors, a separator, and the like) is accommodated together with appropriate electrolyte (not shown in the figure) in a battery case 11, in the same manner as in the typical conventional lithium ion secondary battery. In the present embodiment, the lithium ion secondary battery 10 is an angular battery, but the angular shape is not limiting and the battery may have any shape, for example, a cylindrical shape. Further, the electrode body is not limited to the wound electrode body. For example, a laminated electrode body can be also used. Furthermore, since the features relating to the constituent materials and electrolyte of the battery are not the specific features of the present invention and the explanation thereof is therefore herein omitted. Those features can be selected, as appropriate, by a person skilled in the art according to the object and application on the basis of general technical knowledge.

The battery case 11 is provided with a case main body in which one face (upper face in FIG. 1) of a rectangular parallelepiped box-shaped body is open and a sealing body 25 in the form of a rectangular plate that closes the opening. In the present embodiment, comparatively lightweight aluminum is used as the material constituting the battery case 11, but such a configuration is not limiting. For example, materials similar to those that are used in the conventional lithium ion secondary batteries can be used. More specifically, for example, a metal material such as steel, or a resin material such as polyphenylene sulfide (PPS) and a polyimide resin can be also used. In the sealing body 25, a positive electrode outer connection terminal 13 that is electrically connected to the positive electrode of the electrode body (not shown in the figure) and a negative electrode external connection terminal 19 that is electrically connected to the negative electrode of the electrode body (not shown in the figure) are provided so as to protrude at the upper face of the sealing body (on the outer side of the battery case 11). A safety valve 15 and an electrolyte pouring unit 17 for pouring electrolyte are also provided at the sealing body 25.

A current interrupt mechanism 40 actuated by the increase in pressure inside the case is provided inside the battery case 11. In this configuration, the current interrupt mechanism 40 is provided in a conductive path that electrically connects the positive electrode with the positive electrode outer connection terminal 13. More specifically, as shown in FIG. 2, the current interrupt mechanism 40 is provided with at least an inversion plate 50 and a current collector 60 as constituent members.

In this configuration, the inversion plate 50 is electrically connected to the positive electrode outer connection terminal 13 and has in the central portion thereof an inversion section 51 that can be displaced outward of the battery case 11 when the pressure inside the battery case 11 exceeds a predetermined pressure. Since the inversion plate 50 is by itself configured to be capable of cutting off the gas passage between the interior and exterior of the battery case 11, the inversion plate can reliably receive the increased pressure inside the battery case 11 and can be easily inverted when the pressure inside the case exceeds a predetermined pressure. Further, a conductive sealing body tab 30 is provided between the inversion plate 50 and the positive electrode outer connection terminal 13, and the sealing body tab 30 maintains electric conduction therebetween and is joined to the circumferential edge section of the inversion plate 50, thereby fixing the inversion plate 50.

The current collector 60 is provided further inside the case 11 with respect to the inversion plate 50 and electrically connected to the positive electrode. An easily breakable section 61 that can be easily broken is provided in part of the current collector. The inversion plate 50 and the current collector 60 are electrically and mechanically joined to each other at the inversion section 51 and the easily breakable section 61, respectively. Joining between the positive electrode outer connection terminal 13, sealing body tab 30, inversion plate 50, and current collector 60 can be advantageously performed by welding (for example, laser welding, spot welding, or the like), and strong joints can be obtained.

In the example shown in FIG. 2, the positive electrode outer connection terminal 13 includes the conductive connection terminal 20, the sealing body tab 30, an insulating gasket 23, and an insulating plate 27. When the connection terminal 20 is mounted on the sealing body tab 30, the sealing plate 25 is inserted between the gasket 23 and the insulating plate 27 and sandwiched therebetween in the insulated state, whereby the sealing plate 25 and the positive electrode outer connection terminal 13 are integrated. Further, the connection terminal 20 has inside thereof a through hole 20*a* that passes through from the outside of the battery 10 to the space formed on the outer side of the current interrupt mechanism 40 inside the battery 10. The through hole 20*a* can be sealed by a terminal plug 21 so that the interior of the battery 10 be sealed.

Thus, in the example shown in FIG. 2, the positive electrode outer connection terminal 13 and the positive electrode are electrically connected, with the connection terminal 20, sealing body tab 30, inversion plate 50, and current collector 60 serving as a conductive path. The lithium ion secondary battery 10 is charged and discharged via such a conductive path.

Figure 3:
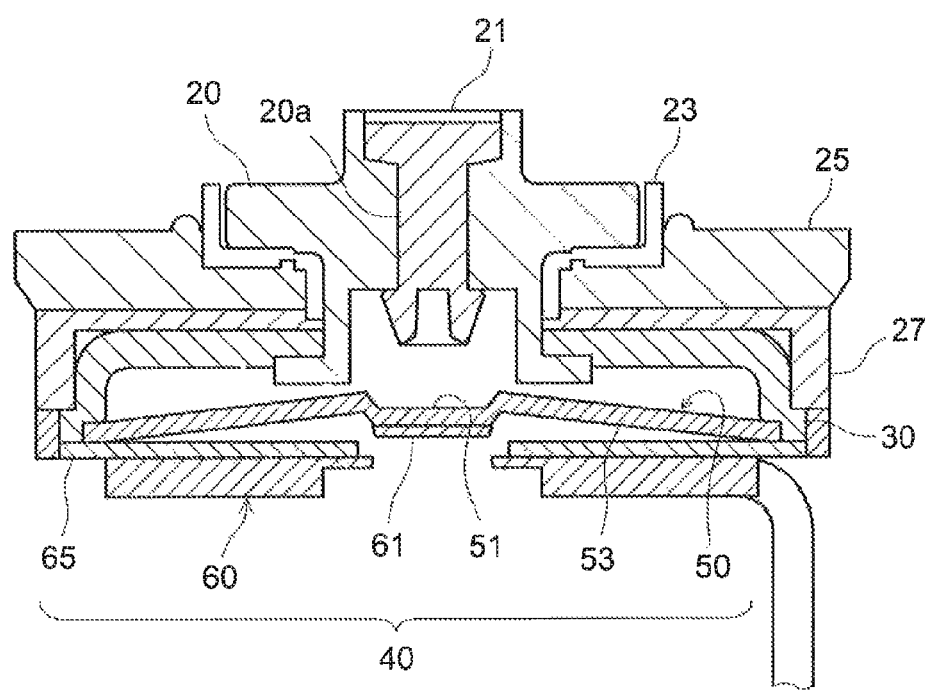
FIG. 3 illustrates the state after the current interrupt mechanism shown in FIG. 2 has been actuated.

In the aforementioned current interrupt mechanism 40, the conductive path is cut off by the increase in pressure inside the case. Thus, for example, where gas is generated inside the battery case 11 due to overcharge of the lithium ion secondary battery 10 and pressure inside the case rises, the corresponding surface of the inversion plate 50 inside the battery case 11 receives the internal pressure. As the internal pressure further increases, the inversion section 51 of the inversion plate 50 starts displacing outward of the battery case 11. In this process, a displacing force acting on the inversion section 51 also acts on the easily breakable section 61 joined to the inversion section 51. When the internal pressure of the battery case 11 exceeds a predetermined pressure, the easily breakable section 61 breaks off from the current collector 60, the inversion section 51 and the easily breakable section 61 are displaced and the inversion plate 50 is inverted as shown in FIG. 3. As a result, the electric connection between the inversion plate 50 and the current collector 60 is disrupted, the conductive path leading from the positive electrode outer connection terminal 13 to the positive electrode (not shown in the figure) is cut off, and the overcharging current is interrupted.

The details, such as the specific configuration and arrangement position of the current interrupt mechanism 40, are not limited to the above-described example. For example, some of the constituent components of the current interrupt mechanism 40 can be modified and the current interrupt mechanism can be provided at a position separated from the sealing plate 13. Further, the current interrupt mechanism may be provided at either of the positive electrode side and negative electrode side, or at both sides. In the current collector 60, the positive electrode collector is typically formed from aluminum or an aluminum alloy, and the negative electrode collector is formed from copper or a copper alloy. Where the two aforementioned options are compared, since aluminum or aluminum alloys are advantageous in terms of the below-described processing of the current collector 60, the example in which the current interrupt mechanism is provided on the positive electrode side is preferred. The configurations and methods used when the current interrupt mechanism 40 is installed in the conductive paths of negative and positive electrodes are substantially the same and the explanation thereof is herein omitted.

The easily breakable section 61 of the current collector 60 is configured to be breakable easier than other portions of the current collector 60. For example, the easily breakable section 61 may be formed thinner than other portions of the current collector 60, as shown in FIG. 2. Further, a configuration may be used in which a notch 63 is provided along the circumferential edge section of the easily breakable section 61, and the notch 63 can be broken easier than other portions. The above-described configurations are not limiting. For example, a hole may be formed in a plate-shaped section of the current collector 60, and a metal sheet or the like may be provided so as to cover this hole, thereby forming the easily breakable section 61. The material of the current collector 60 is not particularly limited, provided that this material is conductive, but a material with a suitably good electric conductivity is preferred for the electrode collectors. Further, a gas flow-through hole (not shown in the figure) may be formed in the current collector 60, so as to transfer the internal pressure of the battery case 11 directly to the inversion plate 50.

As follows from the explanation above, basically, the inversion plate 50 can be advantageously used that is obtained by machining to a shape obtained when the current interrupt mechanism 40 is actuated and the inversion section 51 is displaced. The inversion plate 50 provided with such a post-deformation shape can be deformed into a substantially flat shape by applying stresses from the outside of the battery case 11, and the inversion section 51 of the inversion plate thus deformed can be joined to the easily breakable section 61.

The shape of the inversion section 51 after the displacement is not particularly limited, provided that the distance of closest approach between the collector (conductive section on the electrode body side) after the current interrupt mechanism 40 has been actuated and the easily breakable section after the displacement (distance of closest approach) is within a predetermined range that is described hereinbelow in greater detail. For example, the shape of the inversion section may be substantially round or substantially square in a plan view of the entire inversion plate 50. Further, the shape of the inversion section 51 is also not particularly limited. For example, the shape of the inversion section may be substantially round or substantially square in a plan view thereof, similarly to the shape of the inversion plate 50. When the entire inversion plate 50 is substantially round in a plan view thereof, the current interrupt mechanism 40 that has better assembling ability and sealing ability can be obtained by fixing the circumferential edge section of the inversion plate with the sealing body tab 30.

It is more preferred that the inversion plate 50 have a substantially round inversion section 51 constituted by a flat surface in the central portion thereof and an inclined section 53 that is substantially round in the plan view thereof and inclines from the inversion section 51 toward the circumferential edge. More specifically, as shown by way of example in FIG. 3, the inclined section 53 is constituted by a curved surface with a constant degree of inclination, and it is preferred that the shape of the entire inversion plate 50 be that of a substantially truncated cone (the cross section has a substantially trapezoidal shape). Where the inversion plate 50 has such a shape, the current interrupt mechanism 40 can be realized that can faster perform the inversion operation (that is, the interruption of the electric current). Further, in addition to the example illustrated by FIG. 3, the inversion plate 50 may be also used that has the inclined section 53 constituted by a curved surface with a variable degree of inclination.

Figure 4:
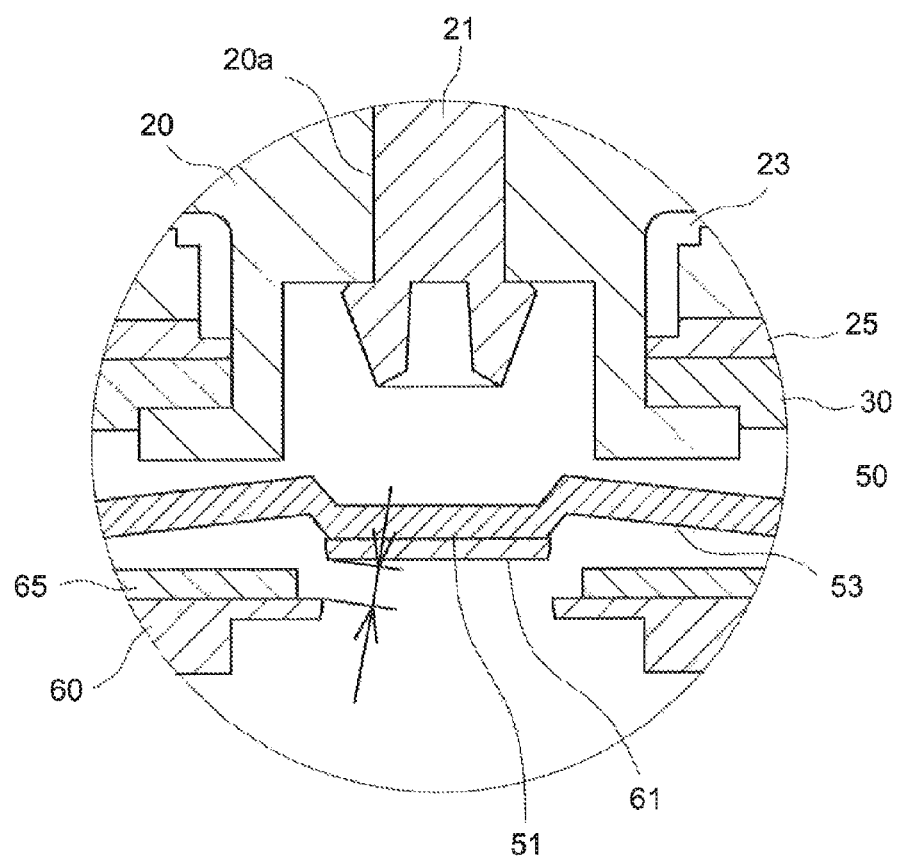
FIG. 4 is a partial enlarged view of the configuration shown in FIG. 3 and illustrates the distance of closest approach between the collector after the current interrupt mechanism has been actuated and the easily breakable section after the displacement.

Furthermore, as shown in FIGS. 2 to 4, the inversion plate 50 may have a shape such that the inversion section 51 protrudes inward of the battery case, that is, such that the inversion section 51 forms a recess for the substantially truncated cone of the inversion plate 50. The depth of this recess can be equal to the thickness of a collector holder 65 that insulates the inversion plate 50 and the collector 60 outside the inversion section 51 and the easily breakable section 61. With such a configuration, the inversion section 51 and the easily breakable section 61 can be easily and reliably joined in the structure of the current interrupt mechanism 40. Further, since the inversion section 51 and the easily breakable section 61 are effectively joined, the easily breakable section 61 can be rapidly and reliably broken following the displacement of the inversion section 51 when the current is interrupted.

As a special feature of the invention disclosed herein, it is important that the distance of closest approach of the easily breakable section 61 and the collector 60 after the operation of the current interrupt mechanism 40 be within a range of 0.3 mm to 1.5 mm, inclusive. FIG. 4 is an enlarged view of the principal section shown in FIG. 3. In this figure, the "distance of closest approach" is between the tips of the arrows. Thus, the "distance of closest approach" is the distance at which the collector 60 in a state after the current interrupt mechanism 40 has been actuated and the easily breakable section 61 after the displacement are the closest to each other, in other words, the distance between the conductive section on the electrode body side and the conductive section on the outer connection terminal 20 side. This "distance" means the distance of closest approach between the two components, without an insulating section (for example, such as the collector holder 65) being interposed therebetween. In the invention disclosed herein, where the distance of closest approach is equal to or greater than 0.3 mm, an appropriate distance can be ensured between the easily breakable section 61 and the collector 60, and a spark discharge can be prevented from occurring between the easily breakable section 61 and the collector 60. The distance of closest approach is preferably equal to or greater than 0.4 mm, more preferably equal to or greater than 0.5 mm, and even more preferably equal to or greater than 1.0 mm. Further, where the distance of closest approach is equal to or less than 1.5 mm, electrolytic solution vapors are prevented from flowing in a large amount into the space formed by the displaced and lifted inversion plate 50, and the occurrence of liquid short-circuit caused by liquefaction of the electrolytic solution vapors can be prevented.

In order to realize faster current interruption during overcurrent, the easily breakable section 61 is subjected to machining that facilitates breaking of this section, typically, by introducing the notch 63 in addition to reducing the thickness of the collector 60. However, the reduced thickness section in the conductive path and the presence of the notch 63 increase the internal resistance and can lead to a problem, for example, of heat generation when a large current flows. Therefore, from the standpoint of increasing the capacity of the sealed battery 10 and increasing the energy density, it is preferred that the residual thickness of the easily breakable section 61, in particular, of the zone thereof where the notch 63 is provided, be as large as possible, so that higher conductivity of the conductive path during usual conduction could be maintained. For this reason, the actuation of the current interrupt mechanism 40 is considered on the basis of making the residual thickness of the easily breakable section 61 as large as possible and increasing the pressure-receiving surface area of the inversion plate 50 so as to receive a larger pressure in the current interrupt mechanism 40. Accordingly, the possibility of increasing the size of the inversion plate 50 to the very limit at which the inversion plate 50 does not interfere with the battery case 11 can be investigated. In this case, where the inclination angle used in the processing of a smaller inversion plate 50 is used as is when the inversion plate 50 is formed, the abovementioned distance of closest approach can exceed 1.5 mm. Therefore, it is important to design such a shape of the inversion plate 50 that the distance of closest approach is equal to or less than 1.5 mm even when the size of the inversion plate 50 is increased.

From this standpoint, such an effect can be demonstrated by using the distance of closest approach of 0.3 mm to 1.5 mm of the invention disclosed herein when the diameter of the bottom portion (can be also understood as the pressure-receiving surface) of the aforementioned inclined section in the inversion plate 50 is from 8 mm to 22 mm. The effect of the invention disclosed herein is demonstrated more apparently as the diameter of the bottom portion of the inclined section in the inversion plate 50 increases from a value equal to or greater than 9 min, 10 mm, 11 mm, 12 mm, and 13 min.

The configuration of the inversion plate 50 is not limited to such that almost the entire inversion plate 50 displaces toward the outside of the battery case 11, as in the present embodiment, and only part of the inversion plate 50 may be displayed to cut off the conductive path and interrupt the electric current. As an example of such an inversion plate 50, a configuration can be considered in which the circumferential edge of the inversion plate has a flat shape and the inclined section 53 of a substantially round shape in the plan view thereof rises on the inner side with respect to the circumferential edge. In this case, the diameter of the bottom portion of the inclined section 53 in the inversion plate 50 can be less than the diameter of the inversion plate 50 by the amount corresponding to the inward displacement of the inclined section 53.

Further, the inversion plate 50 is not limited to the configuration that has a substantially flat shape before the current interrupt mechanism 40 is actuated and displaces so as to protrude outward of the battery case after the actuation, and the inversion plate 50 before the current interrupt mechanism 40 is actuated may be shaped to recede inward of the battery case, rather than to be flat, so that the actuation results in the formation of a substantially flat shape or causes the inversion plate to protrude outward of the case.

Since the battery case 11 has a sealed structure, a gas flow passage passing from the inside of the battery case 11 to the outside thereof is basically unnecessary. However, the connection terminal 20 may be provided with a through hole 20a for communicating the outside of the battery case 11 with the space formed inside the battery case 11 on the outer side of the battery with respect to the current interrupt mechanism 40. Where such a through hole 20a is provided, the space formed inside the battery case 11 on the outer side of the battery with respect to the current interrupt mechanism 40 can be opened, as necessary, to the atmosphere. This through hole can be also used as a gas supply port as the inversion plate 50 is deformed into a flat shape when the battery is constructed. Depending on the size thereof, the through hole 20a may be opened at all times, but in order to prevent foreign matter, for example, such as electrolytic solution or cleaning solution, from penetrating into the current interrupt mechanism, it is preferred that the through hole be sealed with the terminal plug 21, when the through hole is not needed, and the space on the outer side of the battery with respect to the current interrupt mechanism 40 be sealed.

Figure 5:
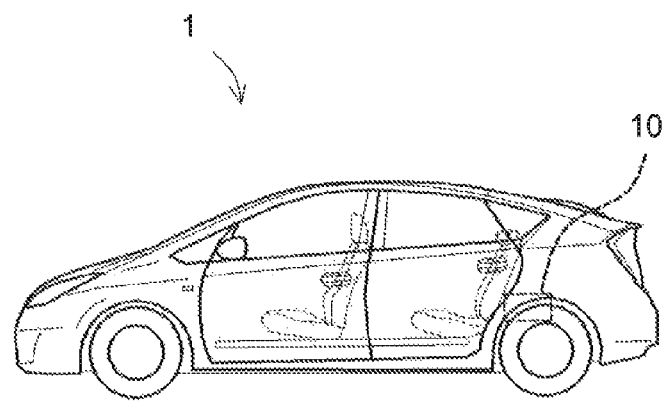
FIG. 5 is a side view of the vehicle according, to an embodiment.

In the sealed lithium ion secondary battery 10 of the above-described configuration, no spark discharge or voltage recovery occurs after the current interrupt mechanism 40 has been actuated during the overcharge, and safety and reliability during the overcharge are increased. Therefore, for example, even when the discharge is controlled by a control system, problems arising when the system malfunctions can be resolved. Further, such a configuration can be advantageously used in batteries that require excellent output characteristic or capacity characteristic in high-rate discharging. The capacity of the battery is not particularly limited, and the aforementioned configuration can be applied to a battery with a rated capacity, for example, equal to or higher than about 3 Ah. Thus, advantageous applications are possible to is battery with a rated capacity, for example, equal to or higher than 10 Ah, typically equal to or higher than 20 Ah (more specifically about 20 to 30 Ah). Applications to batteries with even higher capacity are also possible. Therefore, for example, as shown in FIG. 5, such sealed lithium ion secondary battery 10 can be installed on the vehicle 1 such as an automobile and can be advantageously used as a power source for a drive source of such as an electric motor driving the vehicle 1. As a consequence, the present invention can provide the vehicle (more specifically, an automobile, in particular an automobile provided with an electric motor, such as a hybrid automobile, an electric automobile, or a fuel battery automobile) 1 using the above-described lithium ion secondary battery (typically, a battery pack in which a plurality of batteries are connected in series) 10 as a power source.

Several examples relating to the present invention will be described below, but the present invention is not intended to be limited to those examples.

<Fabrication of Sealed Battery>

The sealing body member provided with the current interrupt mechanism was assembled in the below-described manner.

An aluminum alloy sheet (Al 1050) with a thickness of 0.2 mm was used as an inversion plate, and this plate was machined to the inverted shape (truncated conical shaped) that is to be assumed after the actuation of the current interrupt mechanism. Thus, inversion plates of six types were prepared having a diameter of the inversion section (top section of the truncated cone) of a substantially round shape, in the plan view thereof, of 5 mm and a diameter of the bottom portion of the inclined section (diameter of the bottom portion of the truncated cone) of 5 mm, 8 mm, 11 mm, 17 mm, 22 mm, and 26 mm. The inclined sections and inversion sections of those inversion plates were machined to obtain the designs such that the distance between the collector and the breakable section of the collector after the actuation of the current interrupt mechanism was 0.15 mm, 0.3 mm, 0.5 mm, 1.0 mm, 1.5 mm, and 2.0 mm, respectively.

Sealing body tabs having holes corresponding to the diameters of those inversion plates were then prepared, and the circumferential edge of the hole of each sealing body tab was integrated by welding over the entire circumference with the outer circumferential section of the corresponding inversion plate. The connection terminal was attached to the sealing body tab so as to sandwich the insulating plate, sealing body, and gasket therebetween, and the sealing body tab and the connection terminal were welded together.

Aluminum was used for the positive electrode collector, and an easily breakable section was formed by reducing the thickness of the collector at a position corresponding to the inversion section of the inversion plate and providing a round notch with a diameter of 4.6 mm. The sealing body member was then obtained by laser welding the center of the inversion section of the inversion plate with the easily breakable section of the positive electrode collector. A through hole communicating the outside of the battery with the current interrupt mechanism inside the battery was provided in the connection terminal, and laser welding was conducted in a state obtained by pumping the air from this through hole so as to push the inversion plate back to a substantially flat shape. A rubber terminal plug was inserted into the through hole of the connection terminal after the welding.

A positive electrode sheet was fabricated by forming a positive electrode active material layer using lithium nickel oxide ($LiNiO_2$) as a positive electrode active material on both sides of a positive electrode collector constituted by an Al foil. A negative electrode sheet was fabricated by forming a negative electrode active material layer using graphite as a negative electrode active material on both sides of a negative electrode collector constituted by a Cu foil. A wound electrode body was prepared by laminating the positive electrode sheet and the negative electrode sheet, with two polyolefin separators being interposed therebetween, and winding the laminate.

The positive electrode collector and negative electrode collector of the wound electrode body were welded to the positive electrode collector and negative electrode collector of the sealing body member, respectively, and the sealing body member and the wound electrode body were integrated.

Such an integrated wound electrode body was sufficiently impregnated and saturated with an electrolytic solution and then accommodated in a battery case. The outer circumference of the sealing body was then welded to the battery case to obtain a sealed battery. The electrolytic solution was prepared by adding $LiPF_6$ as a support salt to a nonaqueous solvent obtained by mixing EC, MEC, and DMC at a volume ratio of 3:3:4 to obtain the concentration of the support salt of 1.0 mol/L, and then cyclohexylbenzene (CUB) serving as a gas-generating additive was added to a concentration of 3.5 wt %.

<SOC Adjustment>

The sealed batteries fabricated in the above-described manner were subjected to appropriate conditioning and then SOC adjustment was performed by the following procedures. The SOC adjustment was performed in a temperature environment at a room temperature (25° C.) to obtain a constant temperature effect.

Procedure 1: charging at a constant current of 0.5 C to 4.1 V, and then constant-voltage current to obtain a charging time of 15 h.

Procedure 2: constant-current discharging at 0.5 C to 3.0 V.

Procedure 3: charging again at a constant current of 0.5 C to 4.1 V, and then constant-voltage charging to obtain a charging time of 3 h.

With the above-described processing, the adjustment was performed to a state of charge with SOC 100% at 25° C. The charge capacity at the time of charging at a constant current from 3.0 V to 4.1 V at 25° C. was 20 Ah.

<Overcharge Test>

Each battery after the above-described SOC adjustment was subjected to an overcharge test by the below-described procedure. Thus, each battery was discharged to 4.1 V at room temperature (25° C.), and then the charge current was forcibly caused to flow from a state of 4.1 V under the conditions of a charge current of 40 A and an upper voltage of 10 V by using an external power source.

Even after the inversion plate was inverted and the electric current was interrupted in such an overcharge state, the energizing was continued for 30 min under the same conditions and the presence or absence of a spark discharge (presence or absence of a pulse discharge) was checked. The open circuit was obtained in 30 min after the electric current was interrupted, and the presence or absence of voltage recovery (where or not a voltage equal to or higher than 3.8 V still remained) was checked. The results are shown in Table 1.

<Measurement of Distance of Closest Approach of Contacts>

A total of three cross-sectional X-ray transmission images taken along the diameter of the inversion plate in the current interrupt mechanism were prepared for each of the batteries after the above-described overcharge test, and the distance of closest approach (distance between the contact) between the broken section of the collector (conduction section on the connection terminal side) and the collector main body (conduction section on the electrode body side) was measured. The results are shown in Table 1.

TABLE 1

| Diameter of inversion plate (mm) | Presence/absence of voltage recovery after overcharge | Presence/absence of spark discharge | Distance between contact (mm) |
|---|---|---|---|
| 5 | No | Yes | 0.15 |
| 8 | No | No | 0.3 |
| 11 | No | No | 0.5 |
| 17 | No | No | 1.0 |
| 22 | No | No | 1.5 |
| 26 | Yes | No | 2.0 |

As shown in Table 1, the distance between the contact after the current interrupt mechanism was actuated was confirmed to match the value designed on the basis of the shapes of the collector and inversion plate. Further, it was found that when the distance between the contacts was less than 0.3 mm, a spark was generated between the collector and the inversion plate, and a continuous pulsed discharge was generated. When the distance between the contacts was larger than 1.5 mm, a voltage equal to or higher than 3.8 V was confirmed and the occurrence of the liquid short-circuit effect was confirmed. Thus, it follows from the above that the distance (distance between the contacts) between the broken section of the collector after the actuation of the current interrupt mechanism and the collector main body should be confined within a range from 0.3 mm to 1.5 mm in order to realize the current interruption safely in the sealed battery equipped with the current interrupt mechanism.

What is claimed is:

1. A sealed battery, comprising:
   a positive electrode and a negative electrode;
   a battery case accommodating the positive electrode and the negative electrode;
   an outer connection terminal formed to protrude to the outside of the battery case and electrically connected to one of the positive electrode and the negative electrode; and
   a current interrupt mechanism provided in a conductive path electrically connecting the electrode and the outer connection terminal and cuts off the conductive path,
   the current interrupt mechanism comprising:
   an inversion plate electrically connected to the outer connection terminal and having an inversion section of a substantially round shape that is constituted by a flat surface in the central portion thereof and an inclined section of a substantially round shape in a plan view thereof that inclines from the inversion section toward a circumferential edge and an inner side of the battery case, the inversion plate configured to cut off a gas passage between an interior and exterior of the battery case and receive an increased pressure inside the battery case; and
   a collector disposed further toward the inner side of the case than the inversion plate and electrically connected to the electrode and having an easily breakable section that can be broken in part thereof, wherein
   the collector and the inversion plate are electrically and mechanically joined in the easily breakable section and the inversion section in a state in which the inversion plate includes an internal stress due to the inclined section of the inversion section being deformed into a substantially flat shape,
   the easily breakable section is broken by displacement of the inversion section receiving the increased pressure when a pressure inside the battery case exceeds a predetermined pressure and displaced together with the inversion section, whereby the electric connection of the collector and the inversion plate is interrupted;
   a distance between the collector and the easily breakable section after the displacement is within a range of 0.3 mm to 1.5 mm.

2. The sealed battery according to claim 1, wherein a diameter of a bottom portion of the inclined section is from 8 mm to 22 mm.

3. The sealed battery according to claim 1, wherein
   the outer connection terminal has, inside thereof, a through hole passing from the outside of the battery to the space on the outer side of the current interrupt mechanism; and
   the through hole is sealed with a terminal plug so as to seal the space on the outer side of the current interrupt mechanism.

4. The sealed battery according to claim 1, wherein
   the positive electrode and the negative electrode are laminated, with a separator being interposed therebetween, and the laminate is wound to configure a wound electrode body.

5. The sealed battery according to claim 1, wherein
   the electrode is a positive electrode and the collector is formed from aluminum or an aluminum alloy; and
   the easily breakable section is thinner than other portions of the collector, and a notch is provided along a circumferential edge of the easily breakable section.

6. The sealed battery according to claim 1, which is installed in a vehicle and used as a power source for driving the vehicle.

7. The sealed battery according to claim 6, wherein a rated capacity is 3 Ah to 30 Ah.

8. A vehicle comprising the sealed battery according to claim 1 as a drive power source.

* * * * *